J. PETRY.
METHOD OF MAKING DENTAL MOLDS.
APPLICATION FILED NOV. 8, 1915.

1,313,907.

Patented Aug. 26, 1919.

2 SHEETS—SHEET 1.

WITNESSES
J. R. Keller
John F. Hill

INVENTOR
Jacob Petry
By Kay John Powell
atty

J. PETRY.
METHOD OF MAKING DENTAL MOLDS.
APPLICATION FILED NOV. 8, 1915.

1,313,907.

Patented Aug. 26, 1919.
2 SHEETS—SHEET 2.

WITNESSES
J. R. Keller
John F. Will

INVENTOR
Jacob Petry

UNITED STATES PATENT OFFICE.

JACOB PETRY, OF PITTSBURGH, PENNSYLVANIA.

METHOD OF MAKING DENTAL MOLDS.

1,313,907.

Specification of Letters Patent. Patented Aug. 26, 1919.

Application filed November 8, 1915. Serial No. 60,350.

*To all whom it may concern:*

Be it known that I, JACOB PETRY, a citizen of the United States, and resident of Pittsburgh, in the county of Allegheny and State of Pennsylvania, have invented a new and useful Improvement in Methods of Making Dental Molds; and I do hereby declare the following to be a full, clear, and exact description thereof.

My invention relates to the manufacture of dental plates, and is particularly concerned with the method of making the patterns therefor.

The method of manufacture hereinafter described is primarily, though not exclusively, adapted to the manufacture of dental plates of the kind shown in my Patent No. 1,005,296, dated the 10th day of October, 1911, with which a suction retainer also forming the subject-matter of my prior Patent 990,000, is to be used.

One of the main objects of my present invention is to insure in the finished plate, that the bottom of the socket which receives the suction retainer shall be at all points equal distances from the upper face of the plate, not only along the rim of the overhanging lip which over-laps the edge of the suction retainer, but also throughout the entire area of said socket, so that when the suction retainer is secured in position in this receiving socket of the plate, said retainer will conform exactly to the contours of the roof of the mouth when the plate is in position.

Different expedients have been resorted to heretofore for securing this uniformity in the bottom of this socket, but in every case the plate is originally distorted from its proper contour or becomes so when the suction retainer is secured to it. Or, if the bottom of the socket is not distorted, the lip or rim overlying the edge of the suction retainer is frequently distorted in the effort to remove the molding material from the socket of the molded plate.

In the practice of my invention, I construct the pattern out of plastic material, preferably wax, and in at least two layers. With the plastic layers I employ pattern plates of pliable material for the formation of the pattern of the socket in the plastic material. From this plastic pattern a mold is formed in the manner hereinafter to be described.

Figure 1:
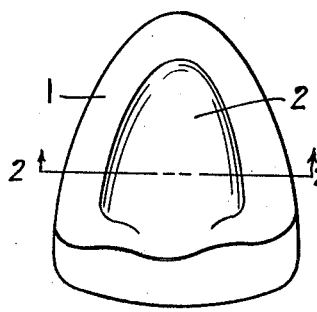
Figure 3:
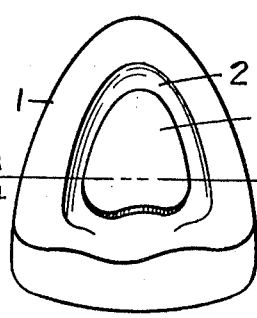
Figure 5:
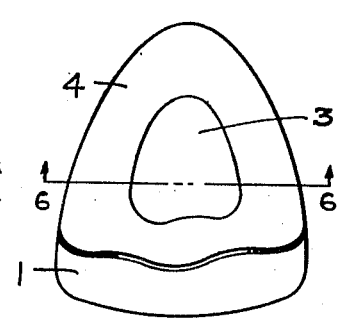
Figure 2:
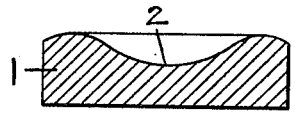
Figure 4:
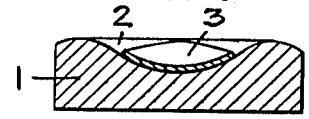
Figure 6:
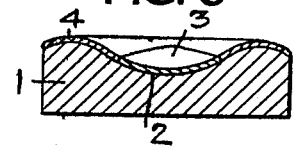
Figure 7:
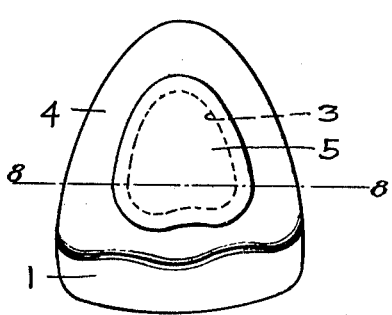
Figure 9:
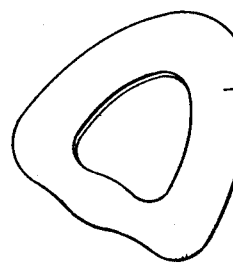
Figure 10:
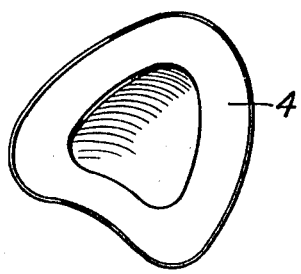
Figure 8:
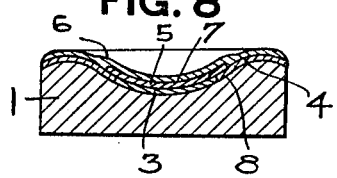
Figure 11:
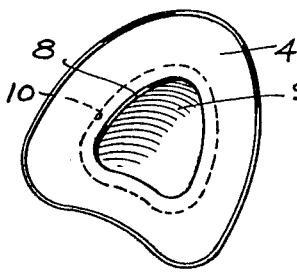
Figure 12:
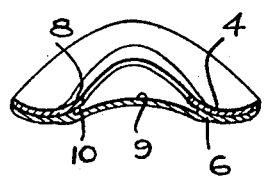
Figure 13:
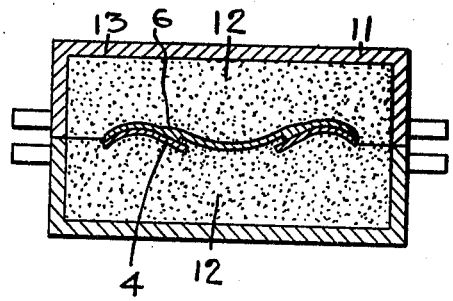
Figure 14:
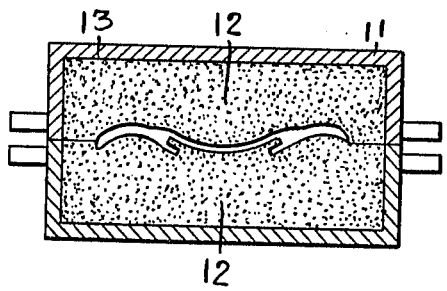
Figure 15:
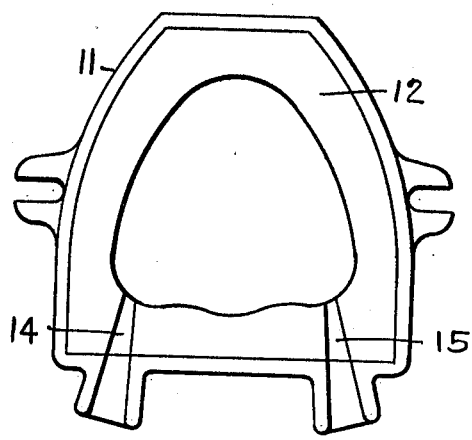
Figure 16:
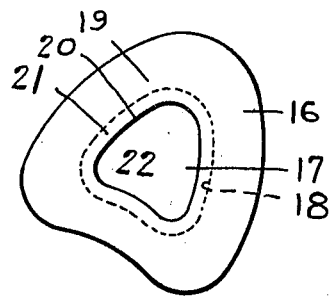
Figure 17:
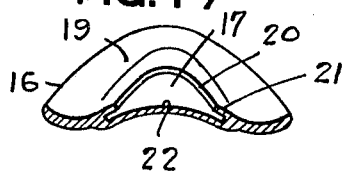

For the purpose of a clear understanding of the invention, the various steps in the method are graphically illustrated in the accompanying drawings in which Figure 1 is a perspective view of a plaster cast of the roof of a mouth; Fig. 2 is a transverse section thereof on the line 2—2; Fig. 3 is a view similar to Fig. 1, showing the first socket pattern plate in position; Fig. 4 is a transverse section of Fig. 3; Fig. 5 is a view showing the first layer of plastic material molded to the cast around the socket pattern plate; Fig. 6 is a section on the line 6—6, Fig. 5; Fig. 7 shows the second socket pattern plate on the cast, Fig. 5; Fig. 8 is a transverse view, on a section similar to a section on the line 8—8, Fig. 7; Fig. 9 is a perspective view of the first plastic pattern layer; Fig. 10 is a similar view of the second plastic pattern layer; Fig. 11 is a perspective view of the plastic pattern assembled; Fig. 12 is a sectional view of the pattern; Fig. 13 shows the plastic pattern incased in a mold flask with a molding material surrounding the same; Fig. 14 is a view similar to Fig. 10 illustrating the mold cavity left by the pattern; Fig. 15 is a plan view of one of the mold sections showing the arrangement of the pouring or blow holes; and Figs. 16 and 17 are perspective and sectional views respectively of the completed metal dental plate.

In the embodiment of the invention herein illustrated, the plaster cast 1 shown in Fig. 1 is given the contour of the roof of the mouth throughout the area 2 by the usual method of taking such impression, and it is the object thereafter that the mold for the dental plate shall conform exactly to these contours in its finished form. Ordinarily, it is a simple matter to produce a pattern for the dental plate from such plaster cast, but with a dental plate of the peculiar construction, having the peculiar form of suction retainer illustrated in my companion patent above referred to, it is necessary that this suction retainer throughout its area shall follow accurately the contours of that surface of the dental plate which has been so shaped. It is necessary to form within the dental plate a cavity or socket to receive the securing foundation portion of the suction retainer, and this socket must therefore be provided with an overlying lip extending throughout the perimeter of the socket. The edge of this lip must remain of the exact contour of the corresponding portion of the roof of the mouth, and the bottom of the socket must conform accurately to the shape of that portion of the roof of the mouth which overlies the socket, but obviously, the bottom of the socket will be removed some little distance from the normal plane or planes of the upper face of the finished plate, in order to provide clearance for the suction retaining member between the bottom of the socket and the roof of the mouth, and this clearance space must be of uniform depth throughout, so that the suction retainer may be held in close relation to the roof of the mouth when the dental plate is in position.

One of the prime objects of this invention, therefore, is to produce a mold which will accurately form the dental plate throughout of proper configuration, but especially one which will produce the bottom of the socket in such plate in exact conformity with that portion of the roof of the mouth which overlies the socket. Many expedients have been tried, but none heretofore in my experience have been successful, for the reason that the overhanging lip of the socket is almost invariably distorted when the pattern is filled in the mold flask, or when the pattern is being removed therefrom, or finally, when the molded plate is removed from the pattern.

In order to overcome these difficulties, I form the pattern itself of two superposed layers of material, in one of which the opening and outline of the socket lip is formed, and on the other the contours of the base of the socket. For accurate molding, I employ plastic material for the pattern and for a purpose hereinafter described, I prefer to employ easily fusible material, such as wax. The members for forming the socket and opening in the pattern, over and around which the plastic material or wax may be shaped, must be of pliable material, in order that they may conform exactly to the contours of the roof of the mouth overlying the socket opening, and overlying the overhanging lip of the socket.

Referring to Fig. 2 of the drawings, I first place upon the molded face of the plaster cast a thin plate 3 preferably consisting of layers of pliable material, such as tinfoil, tissue paper, or like material, which is pressed down hard against the molded face to cause the same to conform exactly to its contours. A layer of plastic material, which I shall hereafter refer to as wax, is then placed over the molded face of the cast and over the plate 3, is firmly pressed down around plate 3, and finally is cut away over said plate, leaving a molded rim, such as 4, Fig. 5, surrounding the plate and flush therewith, as indicated in Fig. 6, which completes the molded surface of the upper face of the pattern, or that face which conforms exactly to the contours of the roof of the mouth, as determined by the plaster cast.

The opening formed in this first wax layer 4 conforms exactly to the shape of the suction retaining member, or so much thereof as is to be exposed to the roof of the mouth. This suction retaining member, however, is fastened in place by means of a projecting lip or lateral extension of its base or foundation member and may be cemented thereto; therefore, the socket in the dental plate must have an undercut cavity to receive this suction retainer fastening-lip. In this is presented the problem which this invention, in the main, is intended to solve.

Referring to Fig. 7, it will be seen that a second plate 5, symmetrical in outline with the plate 3 and of similar material, but of larger area, is placed upon said plate 3 and is pressed firmly down upon said plate, so that it will partake exactly of the molded contour of this plate 3, which as before described, conforms to the contours of the molded face 2 of the plaster cast 1.

A second layer of wax such as 6, Fig. 8, is then molded over the plate 5 and over the exposed rim 4 of the first wax layer. Thus it will be seen that that portion of the wax layer 6 adjacent the face 7 of the plate 5, will form the bottom of the socket in the finished pattern, and this bottom face of the socket will necessarily follow accurately the contours of the roof of the mouth throughout the area of the plaster cast underlying the plate 3. At the same time, the portion of the first wax layer 4 extending beneath the edges of the plate 5 will form a lip 8 surrounding the suction retainer opening in the pattern, and the space beneath the lip 8 forms the undercut cavity for the reception of the projecting securing lip of the foundation or backing of the suction retainer.

Before placing the upper layer 6 of wax over the plate 5 and the wax layer 4, the exposed faces of the plate 3, and of the first wax layer 4 are given a thin coating of oil so that the wax layers 4 and 6 may be readily separated for the removal of the shaping plates 3 and 5. Figs. 9 and 10 show these wax levers separated and the plates 3 and 5 removed. The two wax layers are then placed together again, and produce the complete pattern in wax that is shown in perspective face view, Fig. 11, and in sectional view, Fig. 12, wherein the suction retaining cavity or socket is clearly apparent, said socket having the bottom 9 conforming exactly to the contours of the plaster cast 1, the retaining rim 8 which also conforms exactly to the contour of the roof of the mouth, and forms the undercut portion 10 for the reception of the securing part of the suction retainer.

For the purpose of forming from this pattern the mold for the dental plate, the socket or the cavity is first filled with material in semi-fluid state, which completely fills the cavity, including the undercut portion 10 and by reason of its fluid condition, extends into the inmost recesses of said cavity.

One-half of the mold flask 11, Fig. 13, is filled to the proper depth with the molding material 12, and the pattern is laid upon this material and impressed into it. The other half 13 of the flask is also filled with the molding material 12 and filled in against the wax pattern and the filled portion of the cavity. The mold is then provided with the usual blow hole 14 and pouring hole 15, and the two sections are clamped together in the usual manner. The mold is then heated for the purpose, not only of drying out the mold material, but also melting out the wax pattern which is absorbed by the mold material, leaving the mold cavity entirely clear. This melting out of the wax also has the advantage that it fills up the pores of the mold material around the mold cavity, leaving a smooth, clean-cut surface for the production of the molded dental plate. The molten metal from which the plate is to be formed is then poured into the mold in the usual manner, the sections of the mold flask are then separated, and the molded dental plate 16 removed therefrom. All vestiges of molding material are then cut out or otherwise removed from the suction retaining cavity or socket 17, and particularly from the undercut cavity 18. It will be seen, therefore, that the molded face 19 of the plate will conform exactly or will be a reproduction of the molded face 2 of the plaster cast 1, and the edge 20 of the lip 21 overlying the perimeter of the cavity or socket, will likewise conform throughout, to the contours of the roof of the mouth. The cross-section of the undercut cavity 18 of the socket, is exactly the same as that of the securing rim or lip of the suction retainer. The latter, therefore, may be inserted within this cavity, and secured in place in any desired manner, as by cement, and the suction retaining portion of the suction retainer will extend into the opening in the inner face of the plate, and by reason of the fact that the bottom 22 of this cavity corresponds throughout in contour with the contour of the opposite portion of the roof of the mouth, it is obvious that the suction retainer will be held in a shape likewise to conform. Hence, there will be no uncomfortable or irritating projection of the suction retainer above the inner face of the dental plate.

While I have herein described a particular embodiment of the invention, and a particular method of carrying the same into effect, it is to be understood that the invention may be altered in details and arrangement of members, within the scope of the appended claims.

What I claim is:

1. The method of forming a pattern, which consists in taking an impression of the part to be fitted; covering a portion of the area of said impression with a removable filling member; covering the remainder of the impression with a layer of plastic, fusible material; placing over the first filler member a second filler member of greater area, but similar outline; molding plastic material over the first plastic layer and the second filler member to the shape of the opposite side of the pattern; separating the plastic layers; removing the filler members and reassembling the plastic layers to form a pattern having an undercut socket whose bottom parallels in all parts the molded face of the impression member.

2. The method of producing a molded shape having an undercut cavity within one face, which consists in forming a preliminary cast of one side of the article; fitting a filler member to the portion thereof opposite the cavity to be formed; shaping a layer of fusible, plastic material over the rest of the molded face and flush with the filler member; covering the whole with a second layer of fusible, plastic material; shaping the latter to the contours of the opposite face of the finished article; separating said plastic layers; removing the filler member and reassembling the plastic layers, thus forming the completed pattern having a cavity therein formed by said filler member.

3. The method of forming a dental plate having an undercut cavity for attaching a suction retainer thereto, which consists in forming a negative of the roof of the mouth; fitting thereto a pliable filler plate having the outline of the opening of the cavity; covering the rest of the negative with a layer of fusible material flush with said plate; fitting over the first filler plate a second filler plate of greater area, but similar outline; covering the whole with a layer of plastic, fusible material; molding the outer surface thereof to desired shape; separating the plastic layers; removing the filler plates and reassembling said plastic layers, thus forming a pattern having an undercut cavity of the shape of the suction retainer to be secured therein.

4. The method of forming a dental plate having an undercut cavity for attaching a suction retainer thereto, which consists in forming a negative of the roof of the mouth; fitting thereto a pliable filler plate having the outline of the opening of the cavity; covering the rest of the negative with a layer of fusible material flush with said plate; fitting over the first filler plate a second filler plate of greater area, but similar outline; covering the whole with a layer of plastic, fusible material; molding the outer surface thereof to desired shape; separating the plastic layers; removing the filler plates and reassembling said plastic layers, thus forming a pattern having an undercut cavity of the shape of the suction retainer to be secured therein; embedding said pattern in molding material within a mold flask; fusing the pattern, thereby causing the material thereof to be absorbed in the molding material, leaving a mold cavity of the desired shape; filling the cavity in the pattern with a molding composition.

5. The method of forming a pattern for an article having an undercut cavity therein, which consists in forming a negative of one side of the article; conforming a filler member to a portion of the molded area thereof; conforming a plastic layer to the remainder of the area thereof and flush with the filler member; conforming to the first filler member a second filler member of greater area, but similar outline; covering the whole with a second layer of plastic material and shaping the same to the contours of the opposite side of the article; separating said plastic layers; removing the filler members, and reassembling the plastic layers, thus forming a pattern having an undercut cavity therein.

6. The method of manufacturing a dental plate, with means for securing a suction retainer therein, which consists in forming a negative of the roof of the mouth; molding a filler plate of pliable material to the portion of the area thereof opposite the suction retainer receiving opening to be formed in the plate; covering the remainder of the negative with a layer of wax surrounding and flush with said filler plate; molding over the first filler plate a second pliable filler plate of greater area, but similar outline; molding a second layer of wax over the whole, and conforming the same to the shape of the opposite side of the plate; separating the wax layers; removing the filler plates and reassembling the wax layers, thus forming a fusible pattern of the completed plate.

7. The method of manufacturing a dental plate, with means for securing a suction retainer therein, which consists in forming a negative of the roof of the mouth; molding a filler plate of pliable material to the portion of the area thereof opposite the suction retainer receiving opening to be formed in the plate; covering the remainder of the negative with a layer of wax surrounding and flush with said filler plate; coating the whole with oil; molding over the first filler plate a second pliable plate of greater area, but similar outline; molding a second layer of wax over the whole and conforming the same to the shape of the opposite side of the plate; separating the wax layers; removing the filler plates and reassembling the wax layers, thus forming a fusible pattern of the completed plate.

In testimony whereof I, the said JACOB PETRY, have hereunto set my hand.

JACOB PETRY.

Witnesses:
JOHN F. WILL,
J. R. KELLER.

Copies of this patent may be obtained for five cents each, by addressing the "Commissioner of Patents, Washington, D. C."